(12) United States Patent
Ilin et al.

(10) Patent No.: US 10,207,366 B2
(45) Date of Patent: Feb. 19, 2019

(54) LASER RESEAL INCLUDING OPTIMIZED INTENSITY DISTRIBUTION

(71) Applicant: Robert Bosch GmbH, Stuttgart (DE)

(72) Inventors: Alexander Ilin, Ludwigsburg (DE); Jochen Reinmuth, Reutlingen (DE); Mawuli Ametowobla, Stuttgart (DE); Philip Kappe, Hildesheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 297 days.

(21) Appl. No.: 15/368,794

(22) Filed: Dec. 5, 2016

(65) Prior Publication Data

US 2017/0157710 A1    Jun. 8, 2017

(30) Foreign Application Priority Data

Dec. 8, 2015 (DE) .................. 10 2015 224 500

(51) Int. Cl.
| | |
|---|---|
| *B23K 26/06* | (2014.01) |
| *B23K 26/20* | (2014.01) |
| *B23K 26/324* | (2014.01) |
| *B23K 26/0622* | (2014.01) |
| *B23K 101/36* | (2006.01) |
| *B23K 103/00* | (2006.01) |
| *B23K 101/42* | (2006.01) |

(52) U.S. Cl.
CPC ........ *B23K 26/206* (2013.01); *B23K 26/0604* (2013.01); *B23K 26/0622* (2015.10); *B23K 26/324* (2013.01); *B23K 2101/36* (2018.08); *B23K 2101/42* (2018.08); *B23K 2103/50* (2018.08); *B23K 2103/54* (2018.08)

(58) Field of Classification Search
CPC .............. B23K 26/206; B23K 26/0604; B23K 26/324; B23K 26/0622; B23K 2101/36; B23K 2103/54; B23K 2101/42; B23K 2103/50
See application file for complete search history.

(56) References Cited

FOREIGN PATENT DOCUMENTS

WO    2015120939 A1    8/2015

*Primary Examiner* — Michael C Miggins
(74) *Attorney, Agent, or Firm* — Norton Rose Fulbright US LLP; Gerard Messina (57) ABSTRACT

A method is described for manufacturing a micromechanical component including a substrate and a cap connected to the substrate, the cap, together with the substrate, enclosing a first cavity, a first pressure prevailing and a first gas mixture having a first chemical composition being enclosed in the first cavity. An access opening connecting the first cavity to surroundings of the micromechanical component is formed in the substrate or in the cap. The first pressure and/or the first chemical composition is adjusted in the first cavity. The access opening is sealed by introducing energy or heat into an absorbing part of the substrate or of the cap with the aid of a laser. The introduction of the energy or heat is controlled with the aid of a laser beam, which includes a spatial laser pulse expansion.

10 Claims, 5 Drawing Sheets

LASER RESEAL INCLUDING OPTIMIZED INTENSITY DISTRIBUTION

CROSS REFERENCE

The present application claims the benefit under 35 U.S.C. § 119 of German Patent Application No. DE 102015224500.4 filed on Dec. 8, 2015, which is expressly incorporated herein by reference in its entirety.

BACKGROUND INFORMATION

A method is described in PCT Application No. WO 2015/120939 A1 in which, when a particular internal pressure is desired in a cavity of a micromechanical component or a gas mixture having a certain chemical composition is to be enclosed in the cavity, the internal pressure or the chemical composition is frequently adjusted during capping of the micromechanical component or during the bonding process between a substrate wafer and a cap wafer. During capping, for example, a cap is connected to a substrate, whereby the cap and the substrate together enclose the cavity. By adjusting the atmosphere or the pressure and/or the chemical composition of the gas mixture present in the surroundings during capping, it is thus possible to adjust the particular internal pressure and/or the particular chemical composition in the cavity.

With the aid of the method described in PCT Application No. WO 2015/120939 A1, an internal pressure may be adjusted in a targeted way in a cavity of a micromechanical component. It is in particular possible with the aid of this method to manufacture a micromechanical component including a first cavity, a first pressure and a first chemical composition being adjustable in the first cavity, which differ from a second pressure and a second chemical composition at the time of capping.

In the method for targeted adjusting of an internal pressure in a cavity of a micromechanical component according to PCT Application No. WO 2015/120939 A1, a narrow access channel to the cavity is created in the cap or in the cap wafer, or in the substrate or in the sensor wafer. Subsequently, the cavity is flooded with the desired gas and the desired internal pressure via the access channel. Finally, the area around the access channel is locally heated with the aid of a laser, the substrate material liquefies locally and hermetically seals the access channel during solidification.

In rotation rate sensors, for example, a very low pressure is enclosed, which is less than 1 mbar, for example. This is the case because a part of the movable structures is driven resonantly in rotation rate sensors. At low pressure, an oscillation may be excited very easily using relatively low stresses as a result of the slight damping.

In acceleration sensors, in contrast, it is not desirable for the sensor to begin to oscillate, which would be possible upon application of an external acceleration. The sensors are therefore operated at higher internal pressure. The internal pressure of an acceleration sensor is, for example, 500 mbar.

SUMMARY

It is an object of the present invention to provide a method for manufacturing a micromechanical component which is mechanically robust and has a long service life compared to the related art, in a simple and cost-effective manner compared to the related art. It is a further object of the present invention to provide a micromechanical component which is compact, mechanically robust and has a long service life compared to the related art. According to the present invention, this applies, in particular, to a micromechanical component that includes one (first) cavity. With the aid of the method according to the present invention and the micromechanical component according to the present invention, it is furthermore also possible to implement a micromechanical component in which a first pressure and a first chemical composition may be adjusted in the first cavity, and a second pressure and a second chemical composition may be adjusted in a second cavity. For example, such a method is provided for manufacturing micromechanical components, for which it is advantageous if a first pressure is enclosed in a first cavity and a second pressure is enclosed in a second cavity, the first pressure being different from the second pressure. This is the case, for example, when a first sensor unit for rotation rate measurement and a second sensor unit for acceleration measurement are to be integrated into a micromechanical component.

The object may be achieved in accordance with example embodiments of the present invention by providing that the introduction of the energy or heat is controlled with the aid of a laser beam, which includes a spatial laser pulse expansion, which extends essentially along a surface of the substrate or the cap facing away from the first cavity and extending essentially in parallel to a main extension plane of the substrate, and a laser pulse intensity, to minimize internal stresses in the substrate or in the cap.

In this way, a method for manufacturing a micromechanical component is provided in a simple and cost-effective way, using which the introduction of the energy or heat is controllable with the aid a laser beam including a spatial laser pulse expansion and a laser pulse intensity, to minimize internal stresses in the substrate or in the cap. This advantageously enables the energy or heat to be introduced in a targeted spatial way into the substrate or into the cap. Therefore, a first transition of the material area from the solid into the liquid aggregate state and a second transition, which follows the first transition chronologically, of the material area from the liquid into the solid aggregate state in the substrate or in the cap may be controlled in a spatially targeted way. In addition, as a result of the spatial distribution of the energy or heat using the method according to the present invention, areas of the substrate or the cap adjoining the material area of the substrate or the cap may be brought to an increased temperature in comparison to the related art in a spatially targeted way. Therefore, the temperature gradients in the substrate or in the cap, in particular in the area of the access opening, may be reduced in comparison to the related art. This enables the thermal expansion in the event of a temperature increase and/or the thermal shrinking in the event of a temperature reduction of adjacent areas in the substrate or in the cap, in particular in the area of the access opening, to be adapted to one another and therefore the mechanical stresses or internal stresses occurring in the area of the sealed access opening, in particular due to the cooling process after the third method step, to be able to be reduced in comparison to the related art. The dissipation or reduction of locally occurring stresses or tensions is in particular advantageous because the resistance to cracking is therefore increased in comparison to the related art and therefore the probability of a component failure immediately after the sealing of the access opening, during the further processing of the micromechanical component, or during the product service life may be reduced in comparison to the related art. By avoiding cracks, in particular a hermetic seal of the access opening is enabled and therefore the probability of a restriction of the functionality of the micromechanical component due to a leaking seal of the access opening is reduced in comparison to the related art.

Using the method according to the present invention, in particular temperature gradients between the only recently solidified material area and the material surrounding the material area may be reduced in comparison to the related art by spatially targeted increase of the temperature in the substrate or in the cap. In particular, these temperature gradients at the time of the solidification of the material area may be reduced chronologically shortly after the solidification of the material area. This advantageously enables the thermal shrinking of the material area to substantially correspond to the thermal shrinking of the material enclosing the material area or the two thermal shrinkings to be adapted to one another. This advantageously enables the mechanical stresses occurring in the area of the sealed access opening, in particular chronologically after the cooling of the material area, to be reduced in comparison to the related art.

According to the present invention, temperature gradients at a time at which the material area is in a liquid aggregate state or is in the melted state are less critical, because the material area is essentially stress-free at this time. According to the present invention, however, it is provided, for example, that the temperature gradients are also reduced in comparison to the related art at the time at which the material area is in a liquid aggregate state. In particular, the present invention avoids or reduces stresses from building chronologically after the solidification of the material area by the fact that the material area which is only recently solidified is hotter than the material surrounding the material area and thus experiences a stronger/different thermal expansion during the cooling procedure than the colder material surrounding the material area. It is provided according to the present invention that the temperature gradient in the material or in the substrate or in the cap is kept as small as possible during the solidification of the material area and during the cooling, so that the mechanical stresses remaining in the component after cooling are as small as possible.

A further advantage of the method according to the present invention is that the movement of displacements is thermally activatable with the aid of the targeted spatial introduction of the energy or heat into the substrate or into the cap. It is therefore advantageously possible that the substrate or the cap is plastically deformable at least partially or at least partially locally in the area of the access opening, in particular chronologically after the second transition, by thermally activated displacement movements or by facilitated displacement movements. Therefore, locally occurring stresses or stress spikes may be reduced or dissipated in comparison to the related art by plastic deformation with the aid of the targeted introduction of the energy or heat.

The method according to the present invention is also advantageous if surfaces of sensors or sensor cores are provided with organic coatings, which prevent moving structures from sticking to one another, and if these organic coatings degrade and are no longer fully effective at the high temperatures in the bonding method, for example. At least partial release of the organic layers into the cavity and therefore increased internal pressure after sealing the MEMS element may be counteracted in a simple and cost-effective way using the method according to the present invention.

In addition, the method according to the present invention is also advantageous, for example, in relation to a method in which different pressures p1/p2 are required in a cavity of a rotation rate sensor p1 and in a cavity of an acceleration sensor p2, a high pressure which is initially enclosed in both cavities subsequently being brought to a low pressure in the cavity of the rotation rate sensor with the aid of a getter by activating the getter via a temperature step in the cavity of the rotation rate sensor. The method according to the present invention is comparatively simple and cost-effective in relation to such a method.

Furthermore, the method according to the present invention is advantageous if the sealing of a MEMS structure situated in the first cavity using a cap wafer is carried out at high temperatures, for example, using a seal glass as the connecting material or using various other bonding materials or bonding systems, for example, eutectic aluminum-germanium (AlGe) or copper-tin-copper (CuSnCu) systems. Even if the bonding method is carried out under vacuum and at high temperatures, gases vaporize from the bonding system at high temperature and cause a residual pressure in the cavity, which prevails independently of the very low pressure during the bonding method in the bonding chamber and therefore in the cavity. This residual pressure may be significantly reduced in relation to the related art using the method according to the present invention.

In particular, the method according to the present invention is also advantageous, for example, if outgassing of noble gases or other gases from the wafers or from the substrate or from the cap or from a bonding layer takes place during the bonding process, if the noble gases or other gases may be pumped only poorly or not at all by the getter, because the first pressure may be adjusted chronologically after the bonding process with the aid of the access opening using the method according to the present invention. Therefore, such outgassing may be effectively counteracted using the method according to the present invention. This is advantageous because outgassing of noble gases or other gases which may be pumped only poorly or not at all by the getter would restrict the minimum pressure to be achieved and even at higher pressures, this outgassing could cause strong, undesired scattering of the internal pressure.

The laser beam is to be understood in the context of the present invention as electromagnetic radiation which is emitted continuously or non-continuously by a laser. The laser may be, for example, a pulsed laser or a continuous wave laser. In addition, it is provided according to the present invention that the continuous wave laser is operated so that the electromagnetic radiation is continuously emitted or is continuously incident on the absorbing part of the substrate or the cap. In addition, it is provided that the electromagnetic radiation is incident on the absorbing part of the substrate or the cap and is at least partially absorbed thereby.

According to the present invention, a laser beam including a spatial laser pulse expansion and a laser pulse intensity is to be understood to mean that the laser beam includes a spatial intensity distribution, the laser pulse intensity within the spatial laser pulse expansion being greater than zero or greater than a minimum laser pulse intensity. In other words, the spatial laser pulse expansion is defined in such a way that the laser pulse intensity spatially within the laser pulse expansion is greater than zero or is greater than the minimum laser pulse intensity, and that the laser pulse intensity spatially outside the laser pulse expansion is equal to zero or is less than the minimum laser pulse intensity. In the context of the present invention, the laser pulse expansion and the laser pulse intensity is meant essentially along the surface of the substrate or the cap facing away from the first cavity and extending essentially in parallel to the main extension plane of the substrate.

The term "micromechanical component" is to be understood in the context of the present invention to mean that the term includes both micromechanical components as well as microelectromechanical components.

The present invention is preferably provided for a micromechanical component including a cavity or for its manufacture. However, the present invention is also provided, for example, for a micromechanical component including two cavities or including more than two, i.e., three, four, five, six or more than six, cavities.

The access opening is preferably sealed with the aid of a laser by introducing energy or heat into a part of the substrate or of the cap that absorbs this energy or this heat. In this case, energy or heat is preferably introduced chronologically in succession into the respective absorbing part of the substrate or of the cap of multiple micromechanical components, which are manufactured together, for example, on one wafer. Alternatively, however, a chronologically parallel introduction of the energy or heat into the respective absorbing part of the substrate or of the cap of multiple micromechanical components is also provided, for example, using multiple laser beams or laser devices.

Advantageous embodiments and refinements of the present invention are described herein with reference to the figures.

According to one preferred refinement, it is provided that the cap, together with the substrate, encloses a second cavity, a second pressure prevailing and a second gas mixture having a second chemical composition being enclosed in the second cavity.

According to one preferred refinement, it is provided that the introduction of the energy or heat is controlled with the aid of the laser beam in such a way that the laser pulse expansion includes a first laser pulse expansion area having at least one first laser pulse intensity and a second laser pulse expansion area having at least one second laser pulse intensity, a projection of the first laser pulse expansion area on the main extension plane and a projection of the access opening on the main extension plane at least partially overlapping. This advantageously enables the absorbing part to be spatially allocated with the aid of the first laser pulse intensity and the second laser pulse intensity over the first laser pulse expansion area and the second laser pulse expansion area. It is thus advantageously enabled for the material area to only enter a liquid aggregate state in certain areas of the absorbing part.

The laser pulse expansion including a first laser pulse expansion area having at least one first laser pulse intensity and a second laser pulse expansion area having at least one second laser pulse intensity is to be understood according to the present invention to mean that the first laser pulse intensity within the first laser pulse expansion area and the second laser pulse intensity within the second laser pulse expansion area are each greater than zero or greater than a minimum laser pulse intensity. In addition, this is to be understood to mean that the first laser pulse intensity outside the first laser pulse expansion area and the second laser pulse intensity outside the second laser pulse expansion area are each equal to zero or are less than a minimum laser pulse intensity.

According to one preferred refinement, it is provided that the introduction of the energy or heat is controlled with the aid of the laser beam in such a way that a projection of the first laser pulse expansion area on the main extension plane and a projection of the second laser pulse expansion area on the main extension plane are spaced apart from one another. This advantageously enables the introduction of the energy or heat to be carried out in areas which are spatially separated from one another in the substrate or in the cap.

According to one preferred refinement, it is provided that introduction of the energy or heat is controlled with the aid of the laser beam in such a way that a projection of the second laser pulse expansion area on the main extension plane and a projection of the access opening on the main extension plane are spaced apart from one another. This advantageously enables energy or heat to be introduced into an area of the substrate or the cap spaced apart from the access opening.

According to one preferred refinement, it is provided that the introduction of the energy or heat is controlled with the aid of the laser beam in such a way that a first material area of a first absorbing area of the absorbing part of the substrate or the cap enters a liquid aggregate state as a result of the first laser pulse intensity of the first laser pulse expansion area, a second material area of a second absorbing area of the absorbing part of the substrate or the cap entering a liquid aggregate state or remaining in a solid aggregate state as a result of the second laser pulse intensity of the second laser pulse expansion area. This advantageously enables local mechanical stresses, in particular compressive stresses, to be generated in the substrate or the cap, which counteract stresses, in particular tensile stresses, occurring in the area of the access opening.

According to one preferred refinement, it is provided that the introduction of the energy or heat is controlled with the aid of the laser beam in such a way that the spatial laser pulse expansion is formed over the entire area or as a section area of a hollow cylinder extending perpendicularly in relation to the longitudinal axis of the hollow cylinder, the longitudinal axis being essentially coincident with the center point of the access opening. This advantageously enables the energy or heat to be introduced into the substrate or cap in a particularly targeted way.

According to one preferred refinement, it is provided that the introduction of the energy or heat is controlled with the aid of the laser beam in such a way that the second laser pulse expansion area includes a first subarea and a second subarea, a projection of the first subarea on the main extension plane and a projection of the second subarea on the main extension plane being spaced apart from one another. This advantageously enables the energy or heat to be introduced into multiple areas of the substrate or the cap which are spaced apart from the access opening.

According to one preferred refinement, it is provided that the introduction of the energy or heat is controlled with the aid of the laser beam in such a way that the first subarea and the second subarea are formed essentially rotationally-symmetrically and essentially in parallel to the surface. This advantageously enables the energy or heat to be introduced particularly symmetrically into the substrate or into the cap.

According to one preferred refinement, it is provided that the introduction of the energy or heat is controlled with the aid of the laser beam in such a way that the second laser pulse expansion area includes further subareas, in particular three or four or five or six or seven or eight or nine or ten further subareas, the subareas being formed essentially rotationally-symmetrically and essentially in parallel to the surface and being situated essentially rotationally-symmetrically and essentially in parallel to the surface around the access opening with the first subarea and the second subarea. This advantageously enables the energy or heat to be introduced in a particularly symmetrical and targeted way into the substrate or into the cap.

According to one preferred refinement, it is provided that the introduction of the energy or heat is controlled with the aid of the laser beam in such a way that the laser beam includes a laser pulse duration and the laser pulse intensity is provided as chronologically variable. This advantageously enables energy or heat to be introduced in a targeted way into the substrate or into the cap chronologically already before a first transition of the material area from the solid into the liquid aggregate state and chronologically after a second transition of the material area from the liquid into the solid aggregate state. Therefore, as a result of heat conduction in the substrate or in the cap, this enables areas of the substrate or the cap adjoining the material area or the absorbing part of the substrate or the cap to be brought to a temperature which is elevated in comparison to the related art chronologically before the first transition and chronologically after the second transition. The temperature gradients in the substrate or in the cap, in particular in the area of the access opening, are therefore reduced in comparison to the related art. This enables the thermal expansion in the event of a temperature increase and/or the thermal shrinking in the event of a temperature reduction of adjacent areas in the substrate or the cap, in particular in the area of the access opening, to be adapted to one another, and therefore the mechanical stresses occurring in the area of the sealed access opening to be reduced in comparison to the related art.

A further subject matter of the present invention is a micromechanical component having a substrate and a cap connected to the substrate and, together with the substrate, enclosing a first cavity, a first pressure prevailing and a first gas mixture having a first chemical composition being enclosed in the first cavity, the substrate or the cap including a sealed access opening, the substrate or the cap including a material area which solidifies and seals the access opening after a controlled introduction of energy or heat into an absorbing part of the substrate or the cap with the aid of a laser beam including a spatial laser pulse expansion, which extends along a surface of the substrate or the cap facing away from the first cavity and extending essentially in parallel to a main extension plane of the substrate, and a laser pulse intensity, to minimize internal stresses in the substrate or the cap. This advantageously provides a compact, mechanically robust, and cost-effective micromechanical component having an adjusted first pressure. The aforementioned advantages of the method according to the present invention also apply correspondingly to the micromechanical component according to the present invention.

According to one preferred refinement, it is provided that the substrate or the cap includes silicon. This advantageously enables the micromechanical component to be manufactured using standard methods of semiconductor layer technology.

According to one preferred refinement, it is provided that the cap, together with the substrate, encloses a second cavity, a second pressure prevailing and a second gas mixture having a second chemical composition being enclosed in the second cavity. In this way, a compact, mechanically robust, and cost-effective micromechanical component having an adjusted first pressure and second pressure is advantageously provided.

According to one preferred refinement, it is provided that the first pressure is lower than the second pressure, a first sensor unit for rotation rate measurement being situated in the first cavity, and a second sensor unit for acceleration measurement being situated in the second cavity. In this way, a mechanically robust micromechanical component for rotation rate measurement and acceleration measurement, having optimal operating conditions for both the first sensor unit and the second sensor unit, is advantageously provided.

DETAILED DESCRIPTION OF EXAMPLE EMBODIMENTS

Identical parts are denoted by the same reference numerals in the various figures and are therefore generally also cited or mentioned only once.

Figure 1:
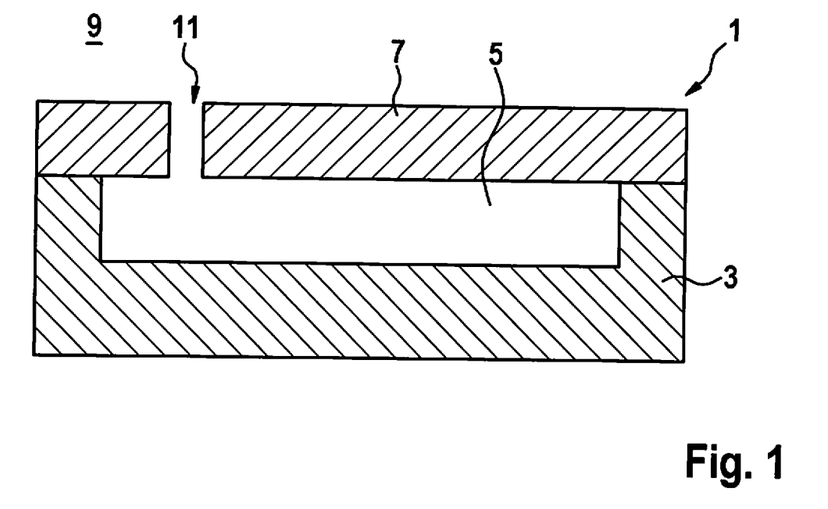
FIG. 1 shows a micromechanical component having an open access opening according to one exemplary specific embodiment of the present invention in a schematic representation.
Figure 2:
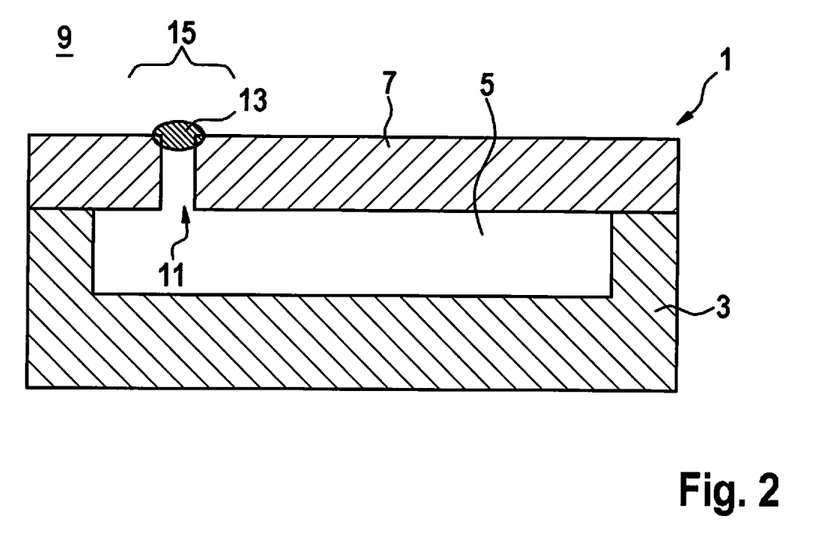
FIG. 2 shows the micromechanical component according to FIG. 1 having a sealed access opening in a schematic representation.

FIG. 1 and FIG. 2 show schematic representations of a micromechanical component 1 having an open access opening 11 in FIG. 1, and having a sealed access opening 11 in FIG. 2, according to one exemplary specific embodiment of the present invention. Micromechanical component 1 includes a substrate 3 and a cap 7. Substrate 3 and cap 7 are, preferably hermetically, connected to one another and together enclose a first cavity 5. For example, micromechanical component 1 is designed in such a way that substrate 3 and cap 7 additionally together enclose a second cavity. The second cavity, however, is not shown in FIG. 1 and in FIG. 2.

For example, a first pressure prevails in first cavity 5, in particular when access opening 11 is sealed, as shown in FIG. 2. Moreover, a first gas mixture having a first chemical composition is enclosed in first cavity 5. In addition, for example, a second pressure prevails in the second cavity, and a second gas mixture having a second chemical composition is enclosed in the second cavity. Access opening 11 is preferably situated in substrate 3 or in cap 7. In the present exemplary embodiment, access opening 11 is situated in cap 7 by way of example. According to the present invention, however, it may also be alternatively provided thereto that access opening 11 is situated in substrate 3.

It is provided, for example, that the first pressure in first cavity 5 is lower than the second pressure in the second cavity. It is also provided, for example, that a first micromechanical sensor unit for rotation rate measurement, which is not shown in FIG. 1 and FIG. 2, is situated in first cavity 5, and a second micromechanical sensor unit for acceleration measurement, which is not shown in FIG. 1 and FIG. 2, is situated in the second cavity.

Figure 3:
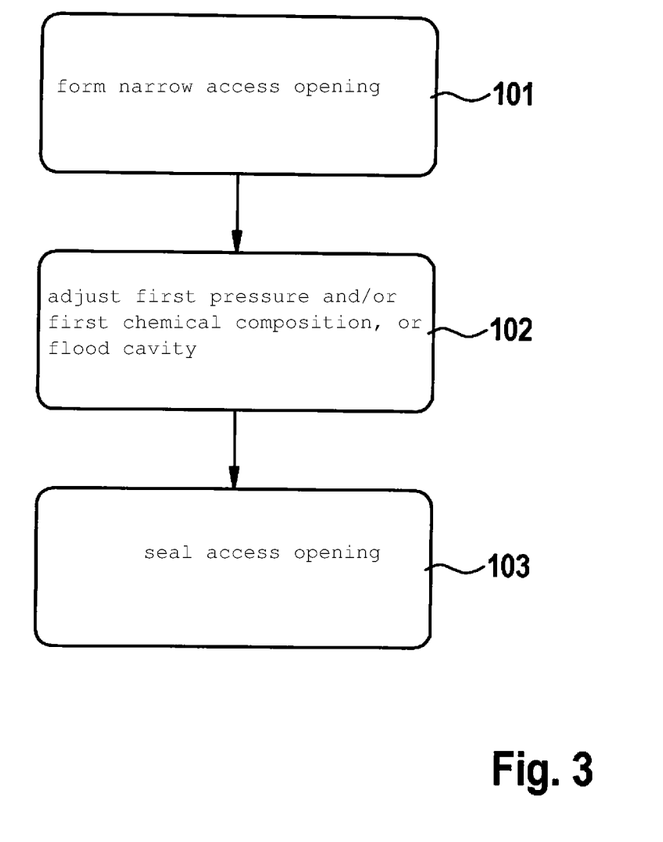
FIG. 3 shows a method for manufacturing a micromechanical component according to one exemplary specific embodiment of the present invention in a schematic representation.

FIG. 3 shows a method for manufacturing micromechanical component 1 according to one exemplary specific embodiment of the present invention in a schematic representation. In this method, in a first method step 101, in particular narrow access opening 11 connecting first cavity 5 to surroundings 9 of micromechanical component 1 is formed in substrate 3 or in cap 7. FIG. 1 shows micromechanical component 1 after first method step 101 by way of example. Moreover, in a second method step 102, the first pressure and/or the first chemical composition in first cavity 5 is adjusted, or first cavity 5 is flooded with the desired gas and the desired internal pressure via the access channel. Furthermore, for example, in a third method step 103, access opening 11 is sealed by introducing energy or heat with the aid of a laser into an absorbing part of substrate 3 or cap 7. Alternatively, for example, it is also provided that in third method step 103, the area around the access channel is preferably heated only locally by a laser, and the access channel is hermetically sealed. It is thus advantageously possible to also provide the method according to the present invention with energy sources other than with a laser for sealing access opening 11. FIG. 2 shows micromechanical component 1 after third method step 103 by way of example.

For example, it is provided that substrate 3 is connected to cap 7 in a fourth method step, the fourth method step being carried out before or after first method step 101.

Chronologically after third method step 103, it is possible for mechanical stresses to occur in a lateral area 15, shown by way of example in FIG. 2, on a surface of cap 7 facing away from cavity 5 and in the depth perpendicularly to a projection of lateral area 15 onto the surface, i.e., along access opening 11 and in the direction of first cavity 5 of micromechanical component 1. These mechanical stresses, in particular local mechanical stresses, prevail in particular on and in the vicinity of an interface between a material area 13 of cap 7, which in third method step 103 enters a liquid aggregate state and after third method step 103 enters a solid aggregate state and seals access opening 11, and a remaining area of cap 7, which remains in a solid aggregate state during third method step 103. In FIG. 2, material area 13 of cap 7 sealing access opening 11 is to be regarded only schematically or is shown only schematically, in particular with respect to its lateral extension or form, extending in particular in parallel to the surface, and in particular with respect to its expansion or configuration perpendicularly to the lateral extension, running in particular perpendicularly to the surface.

Figure 4:
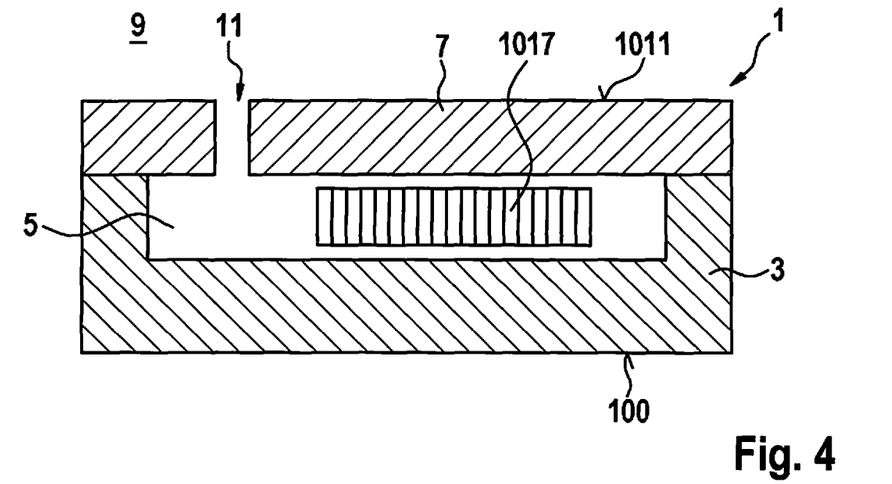
FIG. 4 shows a micromechanical component having an open access opening according to another exemplary specific embodiment of the present invention in a schematic representation.
Figure 5:
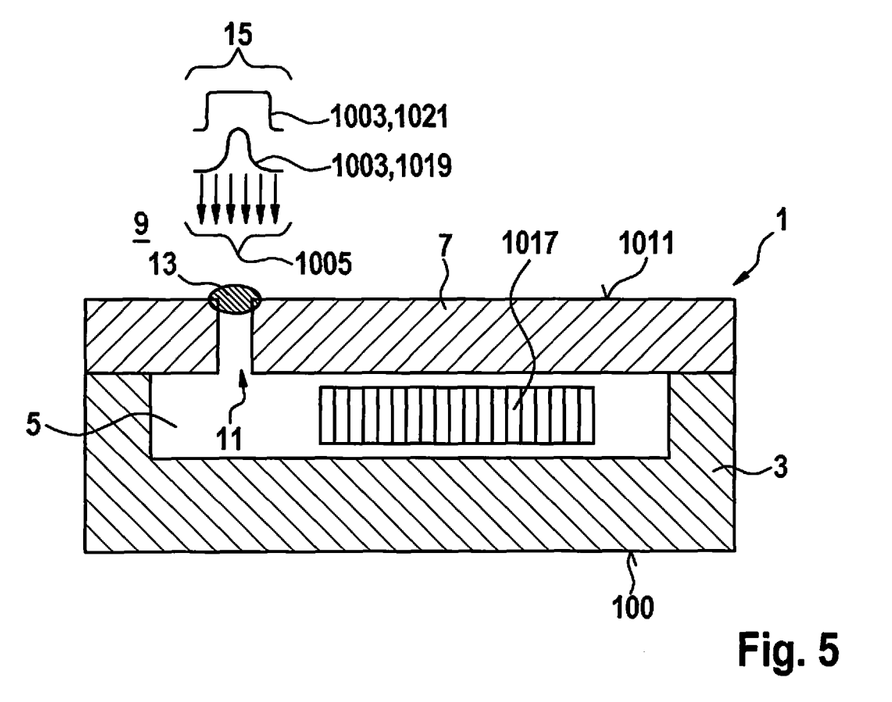
FIG. 5 shows the micromechanical component according to FIG. 4 having a sealed access opening in a schematic representation.

FIG. 4 and FIG. 5 show a schematic representation of a micromechanical component 1 having an open access opening 11 in FIG. 4 and having a sealed access opening 11 in FIG. 5 according to another exemplary specific embodiment of the present invention. It is shown by way of example in this case that a first micromechanical sensor unit for rotation rate measurement 1017 or a MEMS element is situated in first cavity 5. FIG. 4 and FIG. 5 also show a main extension plane 100 of substrate 3 by way of example. In addition, FIG. 5 shows by way of example a surface 1011 extending essentially in parallel to main extension plane 100 and a laser beam 1005. Furthermore, laser pulse intensities 1003 of laser beam 1005 are shown by way of example in FIG. 5. FIG. 5 shows a Gaussian laser pulse intensity 1019 or a Gaussian beam profile and a uniform or top-hat laser pulse intensity 1021 or a uniform or top-hat beam profile by way of example.

It is provided, for example, that spatial intensity profile or laser pulse intensities 1003 of laser radiation 1005 used for the sealing process or the third method step are executed in such a way that internal stresses in the material, which occur in particular during the cooling process, are minimized.

It is provided according to the present invention that the introduction of the energy or heat is controlled with the aid of laser beam 1005, which includes a spatial laser pulse expansion 1001, which extends essentially along surface 1011 of substrate 3 or cap 7, and laser pulse intensity 1003, to minimize internal stresses in substrate 3 or in cap 7.

Figure 6:
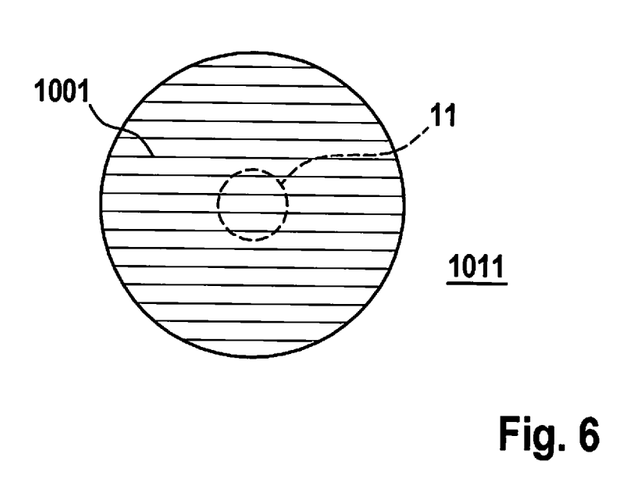
FIG. 6, FIG. 7, FIG. 8, and FIG. 9 show spatial laser pulse expansions according to exemplary specific embodiments of the present invention in schematic representations.
Figure 7:
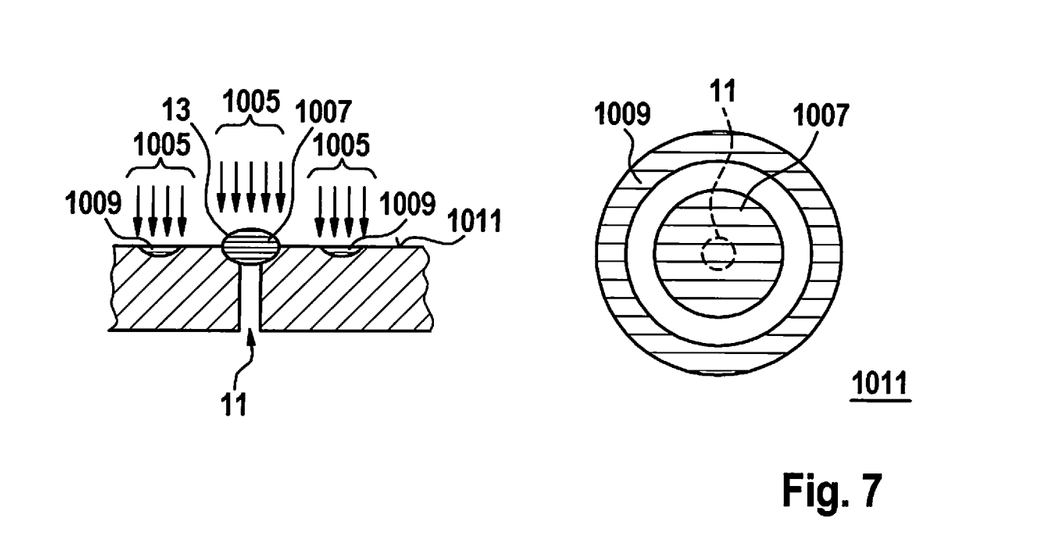
Figure 8:
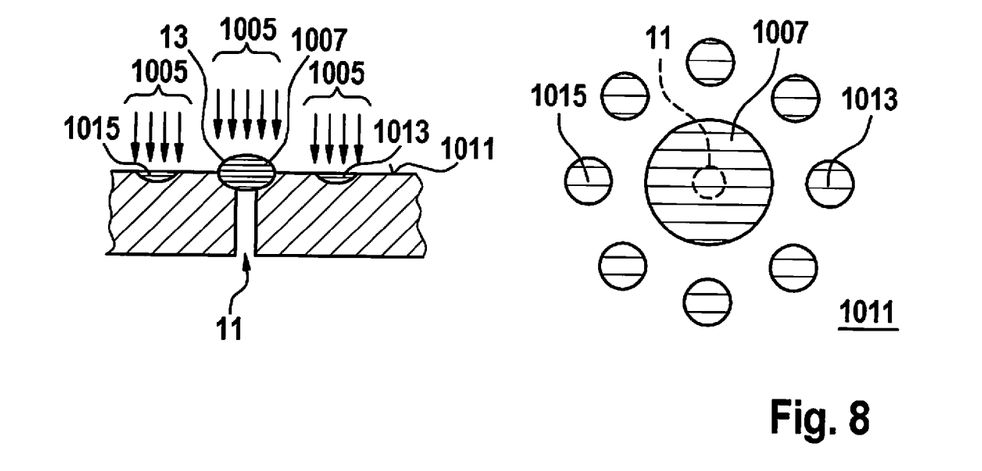
Figure 9:
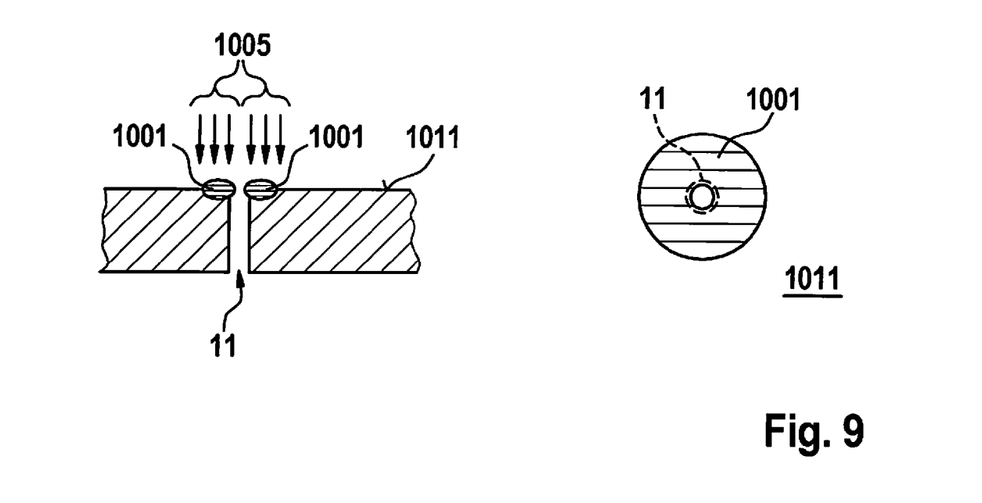

FIG. 6, FIG. 7, FIG. 8, and FIG. 9 show schematic representations of spatial laser pulse expansions 1001 according to exemplary specific embodiments of the present invention. In this case, FIG. 6 shows a full-area spatial laser pulse expansion 1001 by way of example. FIG. 7, FIG. 8, and FIG. 9 each show lateral views or sectional views of a partial area of micromechanical component 1 in the left area and horizontal projections or views of a plane essentially in parallel to surface 1011 in the right area.

Furthermore, it is shown by way of example in FIG. 7 that spatial laser pulse expansion 1001 includes a first laser pulse expansion area 1007 having at least one first laser pulse intensity and a second laser pulse expansion area 1009 having at least one second laser pulse intensity. In this case, a projection of first laser pulse expansion area 1007 on main extension plane 100 and a projection of access opening 11 on main extension plane 100 at least partially overlap. Furthermore, FIG. 7 shows by way of example that a projection of first laser pulse expansion area 1007 on main extension plane 100 and a projection of second laser pulse expansion area 1009 on main extension plane 100 are spaced apart from one another. In addition, FIG. 7 shows by way of example that a projection of second laser pulse expansion area 1009 on main extension plane 100 and a projection of access opening 11 on main extension plane 100 are spaced apart from one another.

It is provided in spatial laser pulse expansion 1001 shown by way of example in FIG. 7, for example, that a first material area of a first absorbing area of the absorbing part of substrate 3 or cap 7 enters a liquid aggregate state as a result of the first laser pulse intensity of first laser pulse expansion area 1007, a second material area of a second absorbing area of the absorbing part of substrate 3 or cap 7 entering a liquid aggregate state or remaining in a solid aggregate state as a result of the second laser pulse intensity of second laser pulse expansion area 1009.

In other words, it is shown by way of example in FIG. 7 that in addition to the molten area around the ventilation hole or material area 13, which is situated in the area of access opening 11, additional areas in the material in the closer or further surroundings are heated or melted. This is advantageous in particular because therefore, for example, local compressive stresses may be generated, which counteract the formation of tensile stresses in the sealing area or in the immediate area of access opening 11. For example, a combination of a high first laser pulse intensity with a high second laser pulse intensity is provided. For example, second laser pulse expansion area 1009 surrounds the sealing area or access opening 11 in the shape of a ring or circle at a defined distance. In this case, the second laser pulse intensity is adjusted in such a way, for example, that melting does not occur in second laser pulse expansion area 1009, but rather only heating.

FIG. 8 shows by way of example that second laser pulse expansion area 1009 includes a first subarea 1013 and a second subarea 1015. It is provided in this case, for example, that a projection of first subarea 1013 on main extension plane 100 and a projection of second subarea 1015 on main extension plane 100 are spaced apart from one another. In addition, FIG. 8 shows by way of example that first subarea 1013 and second subarea 1015 are formed essentially rotationally-symmetrically or punctiform and essentially in parallel to surface 1011. Finally, FIG. 8 shows by way of example that second laser pulse expansion area 1009 includes six further subareas. It is shown in this case by way of example that the subareas are formed essentially rotationally symmetrically or punctiform and essentially in parallel to surface 1011 and are situated essentially rotationally symmetrical around access opening 11 and essentially in parallel to surface 1011 with first subarea 1013 and with second subarea 1015. In other words, FIG. 8 shows by way of example that multiple points in the auxiliary area or in second laser pulse expansion area 1009 are irradiated in a punctiform way.

It is also provided according to the present invention, for example, that first laser pulse expansion area 1007 is a spatial laser pulse expansion of a first laser beam, and second laser pulse expansion area 1009 is a spatial laser pulse expansion of a second laser beam. In addition, it is also provided, for example, that first subarea 1013 is a spatial laser pulse expansion of a third laser beam, and second subarea 1015 is a spatial laser pulse expansion of a fourth laser beam.

Furthermore, for example, it is provided that the further subareas are spatial laser pulse expansions of further laser beams.

Finally, FIG. 9 shows that spatial laser pulse expansion 1001 is formed as a section area of a hollow cylinder extending perpendicularly in relation to the longitudinal axis of the hollow cylinder, the longitudinal axis being essentially coincident with the center point of access opening 11. For example, FIG. 9 shows in this case that a high laser intensity or laser pulse intensity 1003 is only applied to substrate 3 or to cap 7 in the sealing area or in the area of access opening 11, high laser pulse intensity 1003 being situated in a ring shape around the actual ventilation hole or around access opening 11. For example, such a beam profile is a doughnut beam profile.

Spatial laser pulse expansions 1001 shown here are only to be viewed as examples. According to the present invention, arbitrarily shaped single or also multiple spatial laser pulse expansions 1001 are provided, which heat or melt substrate 3 or cap 7 and reduce the local tensile stresses in the sealing area or in the area of access opening 11 in comparison to the related art.

For example, it is also provided that to minimize the stresses, the chronological sequence of the laser irradiation of substrate 3 or cap 7 in the sealing area or in the area around access opening 11 and in the auxiliary area or in areas spaced apart from access opening 11 is controlled suitably.

Further advantages of the method according to the present invention and micromechanical component 1 according to the present invention in relation to the related art may include the following:

Various sensor cores having different requirements for the internal pressure may be combined easily on one chip.
Arbitrary internal pressures, also very low internal pressures, may be adjusted in a MEMS cavity or in first cavity 5.
Internal stresses caused by the laser method used are reliably reduced and the robustness of the components is therefore significantly increased.
The technology is simple, robust, and cost-effective.
The manufacturing method is compatible with the known manufacturing processes, for example, also with capping processes, for example, with aluminum-germanium (AlGe) eutectic bonding and with seal glass bonding.
The method according to the present invention enables a seal of the MEMS cavity which is particularly stable over the service life.

What is claimed is:

1. A method for manufacturing a micromechanical component including a substrate and a cap connected to the substrate, the cap, together with the substrate, enclosing a first cavity, a first pressure prevailing and a first gas mixture having a first chemical composition being enclosed in the first cavity, the method comprising:
   in a first method step, forming, in the substrate or the cap, an access opening connecting the first cavity to surroundings of the micromechanical component;
   in a second method step, adjusting, in the first cavity, at least one of the first pressure and the first chemical composition;
   in a third method step, sealing the access opening by introducing energy or heat into an absorbing part of the substrate or the cap, with the aid of a laser, wherein the introduction of the energy or heat is controlled with the aid of a laser beam, which includes a spatial laser pulse expansion extending along a surface of the substrate or the cap facing away from the first cavity and extending in parallel to a main extension plane of the substrate, and a laser pulse intensity to minimize internal stresses in the substrate or in the cap.

2. The method as recited in claim 1, wherein the introduction of the energy or heat is controlled with the aid of the laser beam in such a way that the spatial laser pulse expansion is formed over an entire area or as a section area of a hollow cylinder extending perpendicularly in relation to the longitudinal axis of the hollow cylinder, the longitudinal axis being coincident with a center point of the access opening.

3. The method as recited in claim 1, wherein the introduction of the energy or the heat is controlled with the aid of the laser beam in such a way that the laser pulse expansion includes a first laser pulse expansion area having at least one first laser pulse intensity and a second laser pulse expansion area having at least one second laser pulse intensity, a projection of the first laser pulse expansion area on the main extension plane and a projection of the access opening on the main extension plane at least partially overlapping.

4. The method as recited in claim 3, wherein the introduction of the energy or heat is controlled with the aid of the laser beam in such a way that a projection of the first laser pulse expansion area on the main extension plane and a projection of the second laser pulse expansion area on the main extension plane are spaced apart from one another.

5. The method as recited in claim 3, wherein the introduction of the energy or heat is controlled with the aid of the laser beam in such a way that a projection of the second laser pulse expansion area on the main extension plane and a projection of the access opening on the main extension plane are spaced apart from one another.

6. The method as recited in claim 3, wherein the introduction of the energy or heat is controlled with the aid of the laser beam in such a way that a first material area of a first absorbing area of the absorbing part of the substrate or the cap enters a liquid aggregate state as a result of the first laser pulse intensity of the first laser pulse expansion area, a second material area of a second absorbing area of the absorbing part of the substrate or the cap entering a liquid aggregate state or remaining in a solid aggregate state as a result of the second laser pulse intensity of the second laser pulse expansion area.

7. The method as recited in claim 3, wherein the introduction of the energy or heat is controlled with the aid of the laser beam in such a way that the second laser pulse expansion area includes a first subarea and a second subarea, a projection of the first subarea on the main extension plane and a projection of the second subarea on the main extension plane being spaced apart from one another.

8. The method as recited in claim 7, wherein the introduction of the energy or heat is controlled with the aid of the laser beam in such a way that the first subarea and the second subarea are formed rotationally-symmetrically and in parallel to the surface.

9. The method as recited in claim 7, wherein the introduction of the energy or heat is controlled with the aid of the laser beam in such a way that the second laser pulse expansion area includes further subareas, the further subareas being formed rotationally-symmetrically and in parallel to the surface and being situated rotationally-symmetrically around the access opening and in parallel to the surface with the first subarea and the second subarea.

10. A micromechanical component, comprising:
a substrate; and
a cap connected to the substrate, the cap, together with the substrate, enclosing a first cavity, a first pressure prevailing and a first gas mixture having a first chemical composition being enclosed in the first cavity, the substrate or the cap including a sealed access opening;
wherein the substrate or the cap includes a material area which solidifies and seals the access opening after a controlled introduction of energy or heat into an absorbing part of the substrate or the cap with the aid of a laser beam, which includes a spatial laser pulse expansion extending along a surface of the substrate or the cap facing away from the first cavity and extending in parallel to a main extension plane of the substrate, and a laser pulse intensity to minimize internal stresses in the substrate or in the cap.

* * * * *